US007653204B2

(12) United States Patent
Chen et al.

(10) Patent No.: US 7,653,204 B2

(45) Date of Patent: Jan. 26, 2010

(54) METHOD AND SYSTEM FOR CODEC WITH POLYRINGER

(75) Inventors: Yue Chen, Fremont, CA (US); Nelson Sollenberger, Farmingdale, NJ (US); Minsheng Wang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1034 days.

(21) Appl. No.: 10/926,762

(22) Filed: Aug. 26, 2004

(65) Prior Publication Data

US 2005/0278044 A1 Dec. 15, 2005

Related U.S. Application Data

(60) Provisional application No. 60/579,272, filed on Jun. 14, 2004.

(51) Int. Cl.
*H04B 1/00* (2006.01)

(52) U.S. Cl. ...................................................... 381/119

(58) Field of Classification Search .................. 381/119
See application file for complete search history.

(56) References Cited

U.S. PATENT DOCUMENTS 5,194,998 A * 3/1993 Kawasaki .................... 360/65
5,986,589 A * 11/1999 Rosefield et al. .............. 341/61

* cited by examiner

*Primary Examiner*—Alexander Jamal
(74) *Attorney, Agent, or Firm*—McAndrews, Held & Malloy, Ltd.

(57) ABSTRACT

In an audio processing device, a method and system for improved CODEC with polyringer are provided. An audio CODEC may comprise an audio ADC, an audio DAC, and a sidetone generator. Data from an external microphone may be processed by an audio ADC and may be sent to a processor that may be adapted to perform digital signal processing operations. The audio DAC may receive from the processor digital audio and polyphonic ringer data and may process the digital audio and polyphonic ringer data through separate digital filters and digital interpolators. The audio DAC may add the processed digital audio and polyphonic ringer data before analog conversion. The audio DAC may perform analog conversion by utilizing a delta-sigma modulator, a current-based DAC, and a switched-capacitor filter. The converted data may be filtered with an RC filter and may be utilized to drive an external speaker or earpiece.

25 Claims, 4 Drawing Sheets

PRIOR ART

METHOD AND SYSTEM FOR CODEC WITH POLYRINGER

CROSS-REFERENCE TO RELATED APPLICATIONS/INCORPORATION BY REFERENCE

This application makes reference to, claims priority to, and claims the benefit of U.S. Provisional Application Ser. No. 60/579,272, entitled "Method and System for Improved CODEC with Polyringer," filed on Jun. 14, 2004.

The above stated application is hereby incorporated herein by reference in its entirety.

FIELD OF THE INVENTION

Certain embodiments of the invention relate to the processing of audio signals. More specifically, certain embodiments of the invention relate to a method and system for an improved CODEC with a polyringer.

BACKGROUND OF THE INVENTION

In audio applications, many audio interface and processing systems may be required to provide duplex operations, which comprise the capability to collect audio information through a sensor or microphone while at the same time being able to drive a speaker or earpiece with processed audio data. In order to carry out these operations, audio interface and processing systems may utilize audio COding and DECoding (CODEC) devices that provide appropriate gain, filtering, and/or analog-to-digital conversion (ADC) in the uplink direction to an audio data processing system and may also provide appropriate gain, filtering, and/or digital-to-analog conversion (DAC) in the downlink direction from the audio data processing system.

FIG. 1A illustrates a block diagram of an exemplary audio interface and processing system. Referring to FIG. 1A, an audio interface and processing system 100 may comprise a microphone 102, a speaker 104, an audio CODEC 106, and a processor 108. The audio CODEC 106 may receive audio information from the microphone 102 and process the received audio information before transferring it to the processor 106. The audio CODEC 106 may also receive audio information from the processor 106 and process the received audio information before transferring to the speaker 104. The processing of audio information provided by the CODEC 106 may comprise encoding and decoding operations. The processor 108 may be adapted to provide digital signal processing to audio information. The processor 108 may be connected to a network and may be adapted to control the transfer of audio information to and from the network. The processor 108 may also be connected to a plurality of data processing devices and may be used to transfer audio information to and from the plurality of data processing devices.

The audio interface and processing system 100 in FIG. 1A may be used, for example, in mobile or wireless handsets where the microphone 102 may collect voice data from a local user while the speaker 104 may provide the local user with voice data from a remote user. The audio CODEC 106, when utilized in wireless handsets, may be optimized to provide efficient coding of the local user's voice data and decoding of the remote user's voice data while the processor 108 may be optimized to provide efficient digital signal processing operations on coded voice data.

The added functionality and advanced applications that may be available in novel audio communication systems may require that audio interface and processing systems in wireless devices allow the user to receive additional audio data in order to interact with the added functionality of the applications. However, audio interface and processing systems, and more specifically, CODEC devices, may not provide the user with an interface that may combine audio data with additional information, and may therefore limit the user's ability to utilize interactive functions and applications that may be available in newer audio-based communication systems.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for a CODEC with a polyringer. Aspects of the method may comprise processing digital polyphonic ringer data and digital audio data and modifying a first data rate of the digital polyphonic ringer data and a second data rate of the digital audio data so that they have a common data rate. At least a portion of the processed and modified digital polyphonic ringer data may be added or combined with the processed and modified digital audio data. The method may also comprise converting to analog format, the added portion of the processed and modified digital polyphonic ringer data and the processed and modified digital audio data. The analog conversion may comprise delta-sigma demodulation, current-based digital-to-analog conversion, and switched-capacitor filtering.

The processing of the digital audio data may comprise high-pass filtering, low-pass filtering, and interpolation, where an integer or fractional interpolation factor may be programmed for the interpolation. The high-pass filtering may be performed by an IIR filter, the low-pass filtering may be performed by an IIR filter, and the interpolation may be performed by an audio sinc filter. The processing of the digital polyphonic ringer data may comprise up-sampling, low-pass filtering, compensation filtering, interpolation, and decimation, where an integer or fractional interpolation factor may be programmed for the interpolation and/or the decimation.

Aspects of the system may comprise an audio DAC that processes a plurality of digital polyphonic ringer data and a plurality of digital audio data. The audio DAC may modify a first data rate of the digital polyphonic ringer data and a second data rate of the digital audio data to arrive at a common data rate and may add at least a portion of the processed and modified digital polyphonic ringer data and the processed and modified digital audio data. The audio DAC may convert to analog format, the added portion of the processed and modified digital polyphonic ringer data and the processed and modified digital audio data.

The audio DAC may comprise an IIR HPF filter, an IIR LPF filter, an audio sinc filter, an up-sampler, an FIR COMP, a polyringer sinc filter, a DAC decimator, an adder, a delta-sigma modulator, a current DAC and SC filter, and an RC filter and speaker driver. The IIR HPF filter may high-pass filter the digital audio data and the IIR LPF filter may low-pass filter the digital audio data. The audio sinc filter may modify the data rate in the digital audio data. At least one processor may be utilized to program an integer or fractional interpolation factor for the audio sinc filter.

The up-sampler may modify the data rate in the digital polyphonic ringer data. The FIR COMP filter may low-pass filter and compensate the digital polyphonic ringer data. The polyringer sinc filter and the DAC decimator may also modify the data rate in the digital polyphonic ringer data. At least one processor may be utilized to program an integer or fractional interpolation factor for the polyringer sinc filter and/or the DAC decimator.

These and other advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for an improved CODEC with a polyringer. A polyringer is an audio signal with a plurality of audio tones that may be ordered into a plurality of sequences. An audio CODEC may comprise an audio ADC, an audio DAC, and a sidetone generator. The audio DAC may receive from a processor, digital audio data and digital polyphonic ringer data and may process the digital audio and polyphonic ringer data through separate digital filters and digital interpolators. The audio DAC may add the processed digital voice and polyphonic ringer data before analog conversion takes place. This approach may provide the user of an audio interface and processing system with audio and polyphonic ringer data in order to interact with audio-based functions and/or applications that may be available in newer communication systems.

Figure 1A:
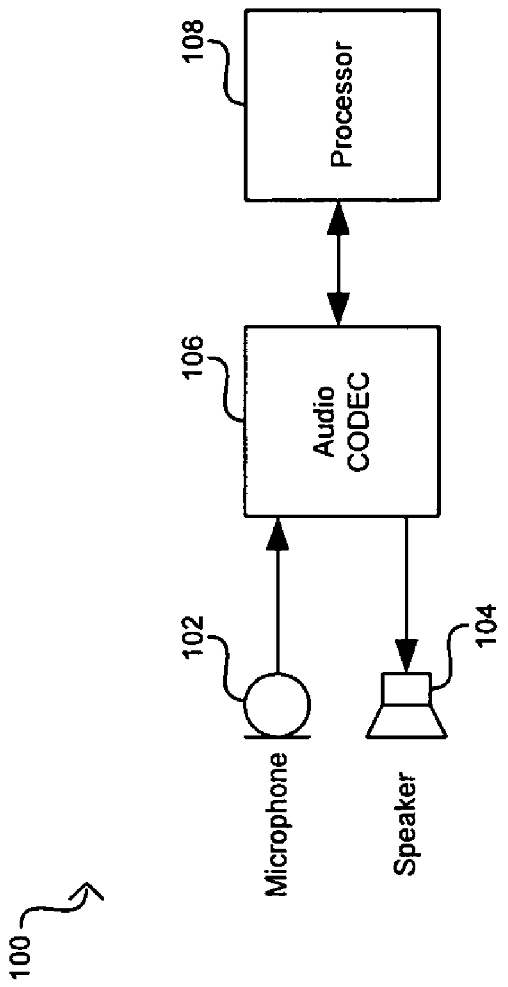
FIG. 1A illustrates a block diagram of an exemplary audio interface and processing system.
Figure 1B:
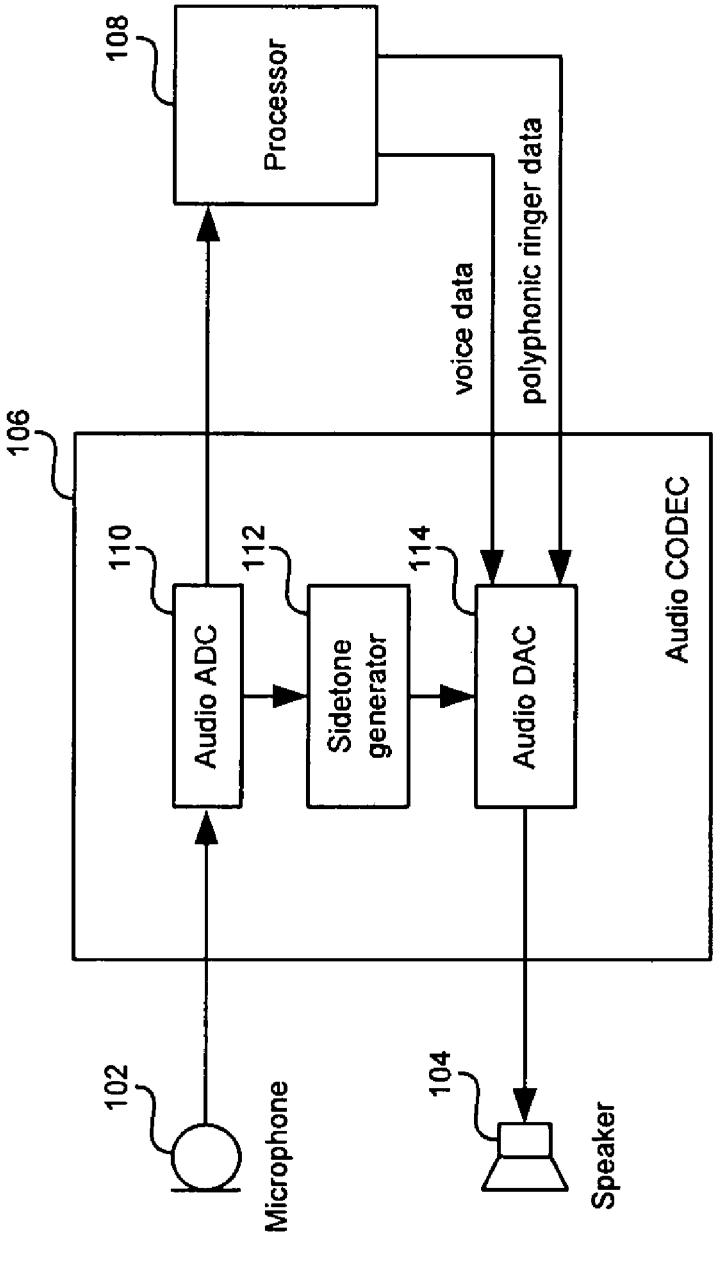
FIG. 1B illustrates a block diagram of an exemplary audio CODEC, in accordance with an embodiment of the invention.

FIG. 1B illustrates a block diagram of an exemplary audio CODEC, in accordance with an embodiment of the invention. Referring to FIG. 1B, the CODEC 106 in FIG. 1A may comprise an audio ADC 110, a sidetone generator 112, and an audio DAC 114. The audio ADC 110 may comprise suitable logic, circuitry, and/or code and may be adapted to process an audio signal from the microphone 102 and transfer the processed audio signal to the processor 108. The sidetone generator 112 may comprise suitable logic, circuitry, and/or code and may be adapted to transfer a portion of the audio signal from the audio ADO 110 to the audio DAC 114. The sidetone generator 112 may be enabled to provide the local user with the ability to hear his or her own voice while speaking to a remote user. The audio DAC 114 may comprise suitable logic, circuitry, and/or code and may be adapted to process voice data and additional audio data, for example, polyphonic ringer data, from the processor 108 and transfer the processed data to the speaker 104. The polyphonic ringer data may comprise a plurality of audio tones and audio tone sequences that may be used to inform the local user that at least one of the functions provided by the system application may be available. The processor 108 in FIG. 1B may be a digital signal processor (DSP) or an embedded processor, such as, an ARM processor.

Figure 2:
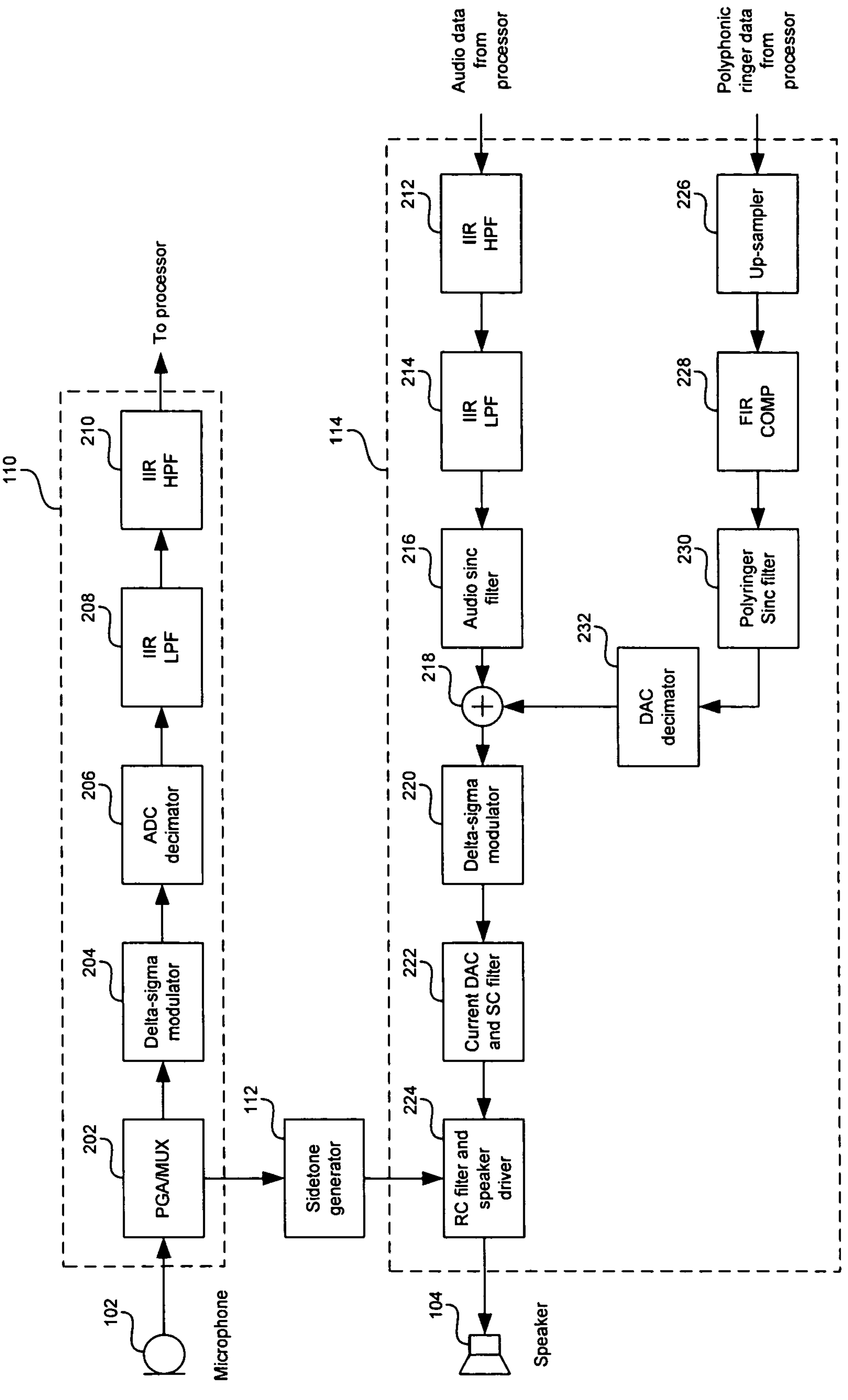
FIG. 2 illustrates a block diagram of an exemplary audio ADC and audio DAC, in accordance with an embodiment of the invention.

FIG. 2 illustrates a block diagram of an exemplary audio ADC and audio DAC, in accordance with an embodiment of the invention. Referring to FIG. 2, the audio ADC 110 in FIG. 1B may comprise a programmable gain amplifier and multiplexer (PGA/MUX) 202, a delta-sigma (ΔΣ) modulator 204, a ADC decimator 206, an infinite impulse response low-pass filter (IIR LPF) 208, and an infinite impulse response high-pass filter (IIR HPF) 210. The audio DAC 114 in FIG. 1B may comprise an infinite impulse response high-pass filter (IIR HPF) 212, an infinite impulse response low-pass filter 214, a voice sinc filter 216, an adder 218, a delta-sigma (ΔΣ) modulator 220, a current digital-to-analog converter (DAC) and switched-capacitor (SC) filter 222, a resistor-capacitor (RC) filter and speaker driver 224, an up-sampler 226, a finite impulse response compensation filter (FIR COMP) filter 228, a polyringer sinc filter 230, and a DAC decimator 232.

The PGA/MUX 202 may comprise suitable logic, circuitry, and/or code and may be adapted to amplify the analog audio signal from the microphone 102. The PGA/MUX 202 may be adapted to select from a plurality of audio sources and the amplification provided by the PGA/MUX 202 may be programmable. The PGA/MUX 202 may transfer at least a portion of the analog audio signal to the sidetone generator 112. The ΔΣ modulator 204 may comprise suitable logic, circuitry, and/or code and may be adapted to convert the analog audio signal from the PGA/MUX 202 to a digital audio data. For example, the ΔΣ modulator 204 may provide oversampled pulse code modulated (PCM) audio data where the digital data may be a 13-bit PCM signal at 8 KHz. The sampling rate provided by the ΔΣ modulator 204 may be much greater than The audio signal bandwidth so that aliasing may not become a factor.

The ADC decimator 206 may comprise suitable logic, circuitry, and/or code and may be adapted to reduce the sampling rate of the audio data output from the ΔΣ modulator 204 by an integer or fractional decimation factor. The ADC decimator 206 may be implemented as a sinc filter and the sampling rate reduction provided by the ADC decimator 206 may be programmable. The IIR LPF 208 may comprise suitable logic, circuitry, and/or code and may be adapted to digitally low-pass filter the audio data output from the ADC decimator 206. The IIR HPF 210 may comprise suitable logic, circuitry, and/or code and may be adapted to digitally high-pass filter the audio data output from the IIR LPF 208. The combined bandpass function provided by the IIR LPF 208 and the IIR HPF 210 may be provided by a digital band pass filter. The IIR HPF 210 may transfer the digitally filtered audio data to the processor 108 and/or to other audio data processing devices, such as a digital signal processor (DSP), for further processing.

The IIR HPF 212 may comprise suitable logic, circuitry, and/or code and may be adapted to digitally high-pass filter the audio data received from the output of an audio data processing device. The audio data processing device may comprise the processor 108. The IIR LPF 214 may comprise suitable logic, circuitry, and/or code and may be adapted to digitally low-pass filter the audio data output from the IIR LPF 212. The combined bandpass function provided by the IIR HPF 212 and the IIR LPF 214 may be provided by a digital band pass filter. The voice sinc filter 216 may comprise suitable logic, circuitry, and/or code and may be adapted to increase the sampling rate of the audio data output from the IIR LPF 214 by an integer or fractional interpolation factor.

The up-sampler 226 may comprise suitable logic, circuitry, and/or code and may be adapted to increase the sampling rate of the polyphonic ringer data from the output of an audio data processing device. The audio data processing device may comprise the processor 108. The FIR COMP filter 228 may comprise suitable logic, circuitry, and/or code and may be adapted to low-pass filter and to provide group delay compensation to the polyphonic ringer data. The polyphonic sinc filter 230 may comprise suitable logic, circuitry, and/or code and may be adapted to increase the sampling rate of the polyphonic ringer data output from the FIR COMP filter 228 by an integer or fractional interpolation factor. The DAC decimator 232 may comprise suitable logic, circuitry, and/or code and may be adapted to reduce the sampling rate of the polyphonic ringer data output from the polyphonic sinc filter 230 by an integer or fractional decimation factor.

The adder 218 may comprise suitable logic, circuitry, and/or code and may be adapted to add the output of the audio data from the output of the voice sinc filter and the polyphonic ringer data from the output of the DAC decimator 232 after a common data rate is achieved for the audio data and the polyphonic ringer data. The ΔΣ modulator 220 may comprise suitable logic, circuitry, and/or code and may be adapted to demodulate audio and polyphonic ringer data from the adder 218. The current DAC and SC filter 222 may comprise suitable logic, circuitry, and/or code and may be adapted to convert the digital output of the ΔΣ modulator 220 to an analog value and to smooth out the analog value by a filtering operation. The RC filter and speaker driver 224 may comprise suitable logic, circuitry, and/or code and may be adapted to filter and provide amplification to the analog audio data from the output of the current DAC and SC filter 222 and from the sidetone generator 112 in order to drive the speaker 104. The amplification or gain provided by the RC filter and speaker driver 224 may be programmable. The RC filter and speaker driver 224 may be used to drive a plurality of speakers and/or earpieces and may be programmed to select at least one of the plurality of speakers and/or earpieces.

Figure 3:
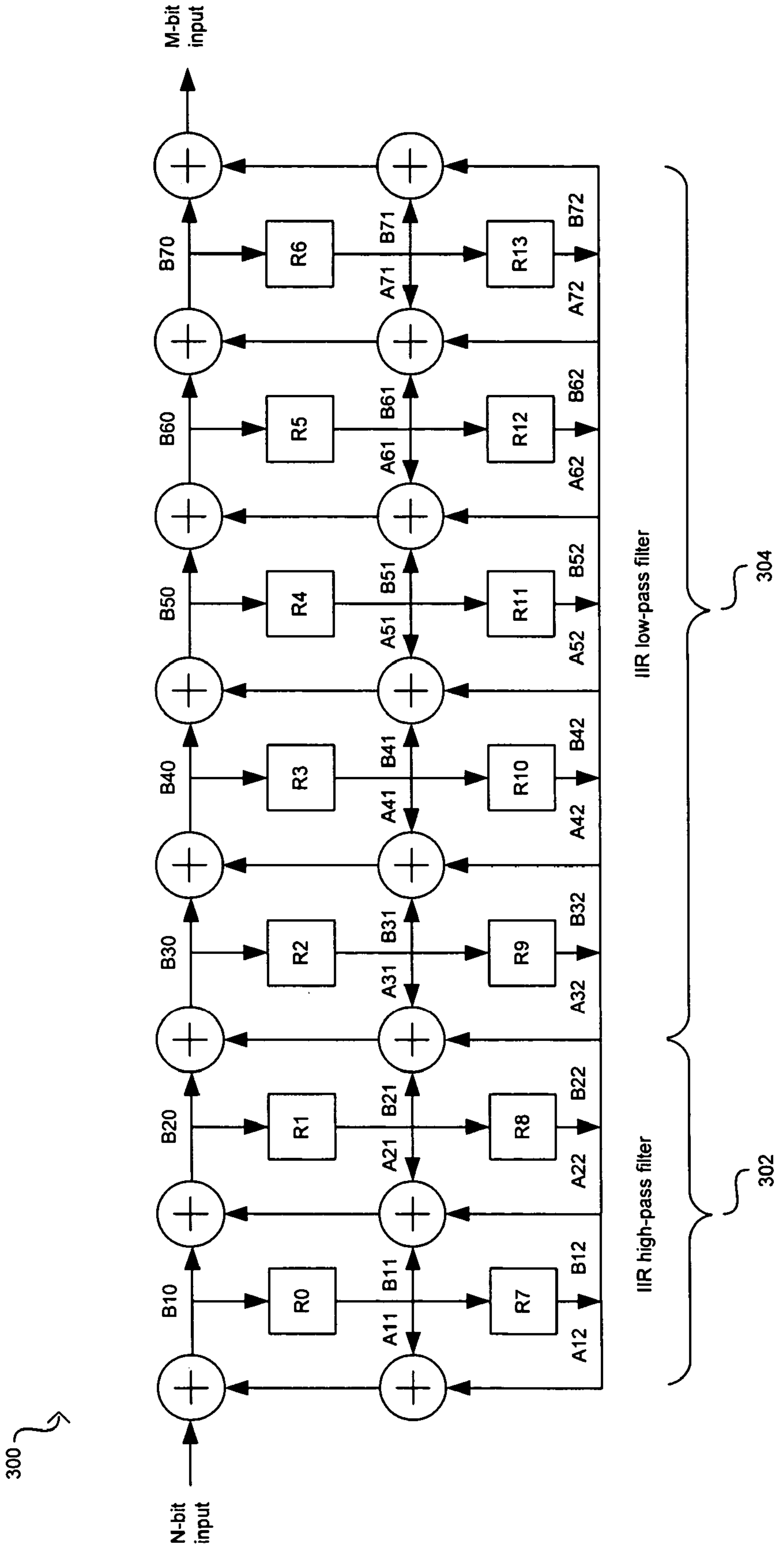
FIG. 3 illustrates a block diagram of an exemplary filter structure that may be utilized for biquadratic digital filters, in accordance with an embodiment of the invention.

FIG. 3 illustrates a block diagram of an exemplary filter structure that may be utilized for biquadratic (BIQUAD) digital filters, in accordance with an embodiment of the invention. Referring to FIG. 3, the filter structure 300 shown may be an exemplary embodiment of a digital IIR high-pass filter 302 followed by a digital IIR low-pass filter 304 utilizing biquadratic digital filters. A biquadratic or biquad filter may be represented by the transfer function:

$$H(z) = \frac{B_{i0} + B_{i1}Z^{-1} + B_{i2}Z^{-2}}{A_{i0} + A_{i1}Z^{-1} + A_{i2}Z^{-2}},$$

where $B_{i0}$, $B_{i1}$, and $B_{i2}$ correspond to the numerator coefficients in the ith biquad filter, $A_{i0}$, $A_{i1}$, and $A_{i2}$ correspond to the denominator coefficients in the ith biquad filter, and $Z^{-1}$ and $Z^{-2}$ correspond to one and two unit delays respectively. The coefficients of the transfer function may be chosen so that the biquad filter may perform a plurality of filtering operations and may be stored in, for example, 15-bit two's complement format. More complex transfer functions may be achieved by placing multiple biquad filters in series and achieving a total transfer function that corresponds to multiplying the transfer functions of the individual biquad filters.

For example, the filter structure 300 shown in FIG. 3 may correspond to the IIR HPF 212 and IIR LPF 214 in the audio DAC 114, where the IIR HPF 212 may be implemented utilizing two biquad filters and the IIR LPF 214 may be implemented utilizing five biquad filters. The filter structure 300 may not be limited to seven biquad filters as shown, but may be implemented with more or fewer biquad filters according to system requirements. The arrows in the filter structure 300 correspond to the numerator and denominator coefficients of the biquad filters and the boxes labeled R0 through R13 correspond to the $Z^{-1}$ and $Z^{-2}$ unit delays for each of the biquad filters. In this exemplary embodiment, the biquad filter transfer function, H(z), has been modified so that the numerator coefficient $A_{i0}$ is 1. The N-bit width input to the IIR HPF 212 may be, for example, a 13-bit input, and the M-bit output of the IIR LPF 214 may be a 20-bit output. The biquad filters may also be utilized to interpolate or decimate the sampling rate of the digital data.

In another embodiment of the filter structure 300, the first five biquad filters may be utilized to implement the IIR LPF 208 and the last two biquad filters, corresponding to the blocks R5, R12, R6, and R13, may be utilized to implement the IIR HPF 210. In this example, the fifth biquad in IIR LPF 208, corresponding to the blocks R4 and R11, may be utilized to decimate a 40 KHz digital audio data from the ADC decimator 206 to an 8 KHz digital audio data, by, for example, selecting 1 out of every five digital samples. In another embodiment of the filter structure 300, the FIR COMP filter 228 may be implemented by utilizing five biquad filters, where the first four biquad filters may be utilized to implement an IIR low-pass filter and the last or fifth biquad filter may be utilized to implement an FIR compensation filter. Biquad filter coefficients may be determined based on fixed bit arithmetic considerations for IIR filter design, the order of the biquad filters, and the gains at each stage in order to limit overflows and quantization effects. Moreover, biquad filter coefficients may be determined to avoid high-Q poles that may result in ringing and instability, and to accommodate for echo suppression requirements in the audio system.

In an exemplary operation and embodiment of the audio ADC 110, the microphone 102 may receive audio information from the local user and/or surrounding environment in the form of an analog signal or analog data and may transfer that analog data to the audio ADC 110. When the PGA/MUX 202 in the audio ADC 110 receives the analog data from the microphone 102, it may amplify the analog data and may then send at least a portion of the analog data to the sidetone generator 112 and to the ΔΣ modulator 204. When the loop between the microphone 102 and the speaker 104 is enabled through by the sidetone generator 112, the portion of the analog data received by the PGA/MUX 202 may be sent to the RC filter and speaker driver 224 so that the local user may hear his or her own voice. The ΔΣ modulator 204 may sample the analog data at a rate of, for example, 13 MHz, and may produce a digital audio output of 4 bits per coded audio sample. The ADC decimator 206 may receive the digital audio data from the ΔΣ modulator 204 and may decimate or reduce the sampling rate from 13 MHz to 40 KHz, for example, corresponding to a decimation factor of 325. The output of the ADC decimator 206 may be a 17-bit digital audio data.

In this exemplary operation and embodiment of the audio ADC 110, the IIR LPF 208 may provide a low-pass frequency of 3.3 KHz and may down-sample the audio data to 8 KHz, corresponding to a decimation factor of 5. The output of the IIR LPF 208 may be a 24-bit digital audio data. The IIR HPF 210 may provide a high-pass frequency of, for example, 200 Hz and may maintain the 8 KHz sampling rate provided by the IIR LPF 208. The output of the IIR HPF 210 may be a 24-bit digital audio data. In another embodiment of the invention, the rate matching necessary between the output of the ADC decimator 206 and the input to the processor 108 may be distributed between the IIR LPF 208 and the IIR HPF 210. The signal-to-noise ratio may be greater than 62 dB at maximum input for this exemplary implementation of the ADC 110.

In an exemplary operation and embodiment of the audio DAC 114, the processor 108 and/or other audio data processing devices may send audio data to the IIR HPF 212 and polyphonic ringer data to the up-sampler 226. The digital audio data may be 13-bits wide and may be sent at a sampling rate of 8 KHz, while the digital polyphonic ringer data may be 16-bits wide and may be sent at a sampling rate of 22.0588 KHz. The IIR HPF 212 may provide a high-pass frequency of 200 Hz and may interpolate the 8 KHz digital audio data to a sampling rate of 40 KHz. The up-sampler 226 may provide an interpolation factor of 4 in order to up-sample the digital polyphonic ringer data to 88 KHz. The output of the IIR HPF 212 and the up-sampler 226 may be 16-bit digital audio data and 16-bit polyphonic ringer data respectively.

In this exemplary operation and embodiment of the audio DAC 114, the IIR LPF 214 may maintain the sampling rate of 40 KHz provided by the IIR HPF 212 and may provide a 20-bit digital audio data output. The FIR COMP filter 228 may maintain the sampling rate of 40 KHz provided by the up-sampler 226 and may provide a 20-bit digital polyphonic ringer data output. The voice sinc filter 216 may interpolate the digital audio data from the IIR LPF 214 to a sampling rate of 2 MHz, corresponding to an interpolation factor of 50, and may provide a 21-bit digital audio data output. The polyringer sinc filter 230 may interpolate the digital polyphonic ringer data from the FIR COMP filter 228 to a sampling rate of 6 MHz, corresponding to an interpolation factor of 150. The DAC decimator 232 may reduce the sampling rate of the digital polyphonic ringer data to 2 MHz, corresponding to a decimation factor of 3, and may provide a 21-bit digital polyphonic ringer data output.

The adder 218 may, for example, add the 2 MHz, 21-bit outputs from the voice sinc filter 216 and the DAC decimator 232, and may interpolate the result to provide a 26 MHz, 21-bit digital output, corresponding to an interpolation factor of 13. The output of the ΔΣ modulator 220 may be down-sampled to 13 MHz, corresponding to a decimation factor of 2. The output of the ΔΣ modulator 220 may be, for example, a 9-level representation of the audio and polyphonic ringer data. The current DAC and SC filter 222 may utilize, for example, 32 current elements to convert the 9 level representation of the audio and polyphonic ringer data to an analog value. The RC filter and speaker driver 224 may amplify and filter the analog value provided by the current DAC and SC filter 222 to drive the speaker 104 and/or to drive a plurality of other audio devices. The signal-to-noise ratio may be greater than 62 dB at maximum input for this exemplary implementation of the DAC 114.

The method and system provided may allow a user of an audio interface and processing system to receive audio and polyphonic ringer data in order to interact with audio-based functions and/or applications that may be available in newer communication systems.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing audio signals, the method comprising:

processing digital polyphonic ringer data and digital audio data;

modifying a first data rate of said digital polyphonic ringer data and a second data rate of said digital audio data in parallel so that said digital polyphonic ringer data and said digital audio data have a common data rate for subsequent delta-sigma modulation; and adding at least a portion of said processed and modified digital polyphonic ringer data and said processed and modified digital audio data prior to said delta-sigma modulation.

2. The method according to claim 1, wherein said processing of said digital audio data comprises high-pass filtering, low-pass filtering, and interpolation.

3. The method according to claim 2, comprising programming an integer or fractional interpolation factor for said interpolation.

4. The method according to claim 2, wherein said high-pass filtering is performed by an IIR filter.

5. The method according to claim 2, wherein said low-pass filtering is performed by an IIR filter.

6. The method according to claim 2, wherein said interpolation is performed by an audio sinc filter.

7. The method according to claim 1, wherein said processing of said digital polyphonic ringer data comprises up-sampling, low-pass filtering, compensation filtering, interpolation, and decimation.

8. The method according to claim 7, comprising programming an integer or fractional interpolation factor for said interpolation.

9. The method according to claim 7, comprising programming an integer or fractional interpolation factor for said decimation.

10. The method according to claim 1, comprising converting to analog format said added portion of said processed and modified digital polyphonic ringer data and said processed and modified digital audio data.

11. The method according to claim 10, wherein said analog format conversion comprises delta-sigma modulation, current-based digital-to-analog conversion, and switched-capacitor filtering.

12. A system for processing audio signals, the system comprising:

an audio DAC that processes digital polyphonic ringer data and digital audio data;

said audio DAC modifies a first data rate of said digital polyphonic ringer data and a second data rate of said digital audio data in parallel so that said digital polyphonic ringer data and said digital audio data have a common data rate for subsequent delta-sigma modulation; and said audio DAC adds at least a portion of said processed and modified digital polyphonic ringer data and said processed and modified digital audio data prior to said delta-sigma modulation.

13. The system according to claim 12, wherein an IIR filter in said audio DAC high-pass filters said digital audio data.

14. The system according to claim 13, wherein an IIR filter in said audio DAC low-pass filters said digital audio data.

15. The system according to claim 13, wherein an audio sinc filter in said audio DAC modifies said second data rate in said digital audio data.

16. The system according to claim 13, wherein at least one processor programs an integer or fractional interpolation factor for an audio sinc filter.

17. The system according to claim 13, wherein an up-sampler in said audio DAC modifies said first data rate in said digital polyphonic ringer data.

18. The system according to claim 13, wherein an FIR COMP filter in said audio DAC low-pass filters and compensates said digital polyphonic ringer data.

19. The system according to claim 13, wherein a polyringer sinc filter in said audio DAC modifies said first data rate in said digital polyphonic ringer data.

20. The system according to claim 13, wherein at least one processor programs an integer or fractional interpolation factor for a polyringer sinc filter.

21. The system according to claim 13, wherein a DAC decimator in said audio DAC modifies said first data rate in said digital polyphonic ringer data.

22. The system according to claim 13, wherein at least one processor programs an integer or fractional interpolation factor for a DAC decimator.

23. An audio DAC, the audio DAC comprising:

an IIR HPF filter coupled to an IIR LPF filter;

said IIR LPF filter coupled to an audio sinc filter;

said audio sinc filter coupled to an adder;

an up-sampler coupled to an FIR COMP filter;

said FIR COMP filter coupled to a polyringer sinc filter;

said polyringer sinc filter coupled to a DAC decimator;

said DAC decimator coupled to said adder;

said adder coupled to a delta-sigma modulator;

said delta-sigma modulator coupled to a current DAC and SC filter; and said current DAC and SC filter coupled to an RC filter and speaker driver.

24. The method according to claim 1, comprising concurrently modifying said first data rate of said digital polyphonic ringer data and said second data rate of said digital audio data.

25. The system according to claim 12, wherein said audio DAC is operable to concurrently modify said first data rate of said digital polyphonic ringer data and said second data rate of said digital audio data.

* * * * *

UNITED STATES PATENT AND TRADEMARK OFFICE

CERTIFICATE OF CORRECTION

PATENT NO. : 7,653,204 B2
APPLICATION NO. : 10/926762
DATED : January 26, 2010
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1553 days.

Signed and Sealed this

Twenty-third Day of November, 2010

David J. Kappos
*Director of the United States Patent and Trademark Office*